(12) United States Patent
Klinkigt et al.

(10) Patent No.: US 12,073,656 B2
(45) Date of Patent: Aug. 27, 2024

(54) ACTIVITY DETECTION DEVICE, ACTIVITY DETECTION SYSTEM, AND ACTIVITY DETECTION METHOD

(71) Applicant: Hitachi, Ltd., Tokyo (JP)

(72) Inventors: Martin Klinkigt, Tokyo (JP); Mohit Chhabra, Tokyo (JP); Junichi Kimura, Tokyo (JP); Tomokazu Murakami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 499 days.

(21) Appl. No.: 17/346,336

(22) Filed: Jun. 14, 2021

(65) Prior Publication Data

US 2022/0012502 A1    Jan. 13, 2022

(30) Foreign Application Priority Data

Jul. 7, 2020    (JP) ................................ 2020-117318

(51) Int. Cl.
*G06V 40/20*    (2022.01)
*G06F 18/214*    (2023.01)
(Continued)

(52) U.S. Cl.
CPC ............ *G06V 40/20* (2022.01); *G06F 18/214* (2023.01); *G06N 3/08* (2013.01); *G06V 10/85* (2022.01);
(Continued)

(58) Field of Classification Search
CPC ........ G06V 40/20; G06V 10/85; G06V 20/41; G06V 20/52; G06V 20/44; G06F 18/214;
(Continued)

(56) References Cited

U.S. PATENT DOCUMENTS 9,305,216 B1 *  4/2016  Mishra .................. G06F 16/583
10,013,627 B1    7/2018  Mishra
(Continued)

FOREIGN PATENT DOCUMENTS

CN    108875588 A    11/2018

OTHER PUBLICATIONS

Singaporean Office Action received in corresponding Singaporean Application No. 10202106752S dated Oct. 21, 2022.
(Continued)

*Primary Examiner* — Tom Y Lu
(74) *Attorney, Agent, or Firm* — MATTINGLY & MALUR, PC

(57) ABSTRACT

An object of the disclosure is to provide flexible and highly accurate activity detection means. Provided is an activity detection device including: an input unit that inputs an image sequence including a first image and a second image; an object detection unit that detects a first object in the image sequence; a component model unit that generates first characteristic information characterizing the first object and includes at least one individually trainable component model; and an activity detection unit that generates a first object state corresponding to the first object in the first image and a second object state corresponding to the first object in the second image based on the first characteristic information and determines an activity related to the first object based on the first and second object states.

14 Claims, 7 Drawing Sheets

(51) Int. Cl.
  *G06N 3/08* (2023.01)
  *G06V 10/84* (2022.01)
  *G06V 20/40* (2022.01)
  *G06V 20/52* (2022.01)

(52) U.S. Cl.
  CPC .............. *G06V 20/41* (2022.01); *G06V 20/52* (2022.01); *G06V 20/44* (2022.01)

(58) Field of Classification Search
  CPC ........ G06F 18/295; G06N 3/08; G06N 3/045; G06N 3/084; G06N 5/01
  See application file for complete search history.

(56) References Cited

U.S. PATENT DOCUMENTS

| | | | | |
|---|---|---|---|---|
| 10,269,116 | B2* | 4/2019 | Parra | G06V 40/23 |
| 2004/0113933 | A1 | 6/2004 | Guler | |
| 2015/0379347 | A1* | 12/2015 | Mishra | G06Q 10/06 |
| | | | | 382/103 |
| 2019/0213406 | A1* | 7/2019 | Porikli | G06V 20/41 |

OTHER PUBLICATIONS

Jun Lei, et al., "Continuus action segmentation and recognition using hybrid convolutional neural network-hidden Markov model model", IET Computer Vision., vol. 10, Issue 6, 2016, pp. 537-544.

Extended European Search Report received in corresponding Application No. 21180721.9 dated Nov. 30, 2021.

Sangho Park et al.: "Recognition of Two-Person Interactions Using a Hierarchical Bayesian Network", International Multimedia Conference—First ACM SIGMM International Workshop on Video Surveillance; Berkeley, California, Nov. 2-8, 2003 (IWVS'03), Jan. 1, 2003 (Jan. 1, 2003), pp. 65-76, XP055359596, New York, NY, US, DOI: 10.1145/982452.982461, ISBN:, ISBN: N/A.

Oliver N M et al.: "A Bayesian Computer Vision System for Modeling Human Interactions", IEEE Transactions on Pattern Analysis and Machine Intelligence, IEEE Computer Society, USA, vol. 22, No. 8, Aug. 1, 2000 (Aug. 1, 2000), pp. 831-843, XP000976489, ISSN: 0162-8828, DOI: 10.1109/34.868684.

Joshua Candamo et al.: "Understanding Transit Scenes: A Survey on Human Behavior-Recognition Algorithms", IEEE Transactions on Intelligent Transportation Systems, IEEE, Piscataway, NJ, USA, vol. 11, No. 1, Mar. 1, 2010 (Mar. 1, 2010), pp. 206-224, XP011283350, ISSN: 1524-9050, DOI: 10.1109/TITS.2009.2030963.

* cited by examiner

ACTIVITY DETECTION DEVICE, ACTIVITY DETECTION SYSTEM, AND ACTIVITY DETECTION METHOD

CROSS-REFERENCE TO RELATED APPLICATION

The present application claims priority from Japanese application JP 2020-117318, filed on Jul. 7, 2020, the contents of which is hereby incorporated by reference into this application.

BACKGROUND

The disclosure relates to an activity detection device, an activity detection system, and an activity detection method.

With a rapid increase of video contents such as photographs, videos, and images in recent years, demand for highly accurate video monitoring technology has been increasing in order to promote social innovation utilizing IoT. In particular, demand for technology that accurately identifies behavior and situations related to a predetermined object by utilizing video contents has been increasing. In the technical field of video analysis, detection of behavior and situations related to a predetermined object is called "activity detection".

Several proposals have been made to perform such activity detection with high accuracy.

For example, a study ("Jun Lei et al., "Continuous action segmentation and recognition using hybrid convolutional neural network-hidden Markov model model". IET Computer Vision (Volume:10, Issue:6,9.2016)" by Jun Lei et al. describes "In this study, the authors propose a hierarchical framework obtained by combining a convolutional neural network (CNN) and a hidden Markov model (HMM). The authors extract effective and robust action features by using the powerful ability of the CNN that learns high-level features directly from image data. The HMM is used to infer an action sequence by modeling the statistical dependencies between adjacent sub-actions. In order to combine the advantages of these two models, a CNN-HMM hybrid architecture is constructed. The Gaussian mixture model is replaced by the CNN to model the emission distribution of the HMM. The CNN-HMM model is trained by using an embedded Viterbi algorithm, and the data used for training of the CNN is labeled with forced alignment."

SUMMARY

"Jun Lei et al., "Continuous action segmentation and recognition using hybrid convolutional neural network-hidden Markov model model". IET Computer Vision (Volume: 10,Issue:6,9.2016)" describes means for detecting an action in a video to be analyzed by using the hierarchical framework obtained by combining the convolutional neural network and the hidden Markov model.

However, since feature extraction is limited to the convolutional neural network in the means described in "Jun Lei et al., "Continuous action segmentation and recognition using hybrid convolutional neural network-hidden Markov model model". IET Computer Vision (Volume:10,Issue:6, 9.2016)", semantic information such as the spatial positional relationship and orientations of objects detected in the video is not considered, and the accuracy of detecting an activity related to the object is limited.

In order to provide more accurate activity detection, there has been a need for activity detection means having a system architecture that can learn more flexibly in an end-to-end manner, unlike conventional means in which a system architecture is fixed.

Accordingly, an object of the disclosure is to provide more flexible and highly accurate activity detection means by determining characteristic information related to a target object by using an individually trainable component model and generating an activity detection result based on an object state generated from the characteristic information.

In order to solve the above problem, one of representative activity detection devices of the disclosure includes: an input unit that inputs an image sequence including at least a first image and a second image; an object detection unit that detects a first object in the image sequence; a component model unit that outputs first characteristic information characterizing the first object and includes at least one or more individually trainable component models; and an activity detection unit that generates a first object state corresponding to the first object in the first image and a second object state corresponding to the first object in the second image based on the first characteristic information, determines an activity related to the first object based on the first object state and the second object state, and outputs a first activity detection result indicating the determined activity.

According to the disclosure, it is possible to provide more flexible and highly accurate activity detection means by determining characteristic information related to a target object by using an individually trainable component model and generating an activity detection result based on an object state generated from the characteristic information.

The problems, configurations, and effects other than those described above will become more apparent by the following description of the embodiment.

DETAILED DESCRIPTION

Figure 1:
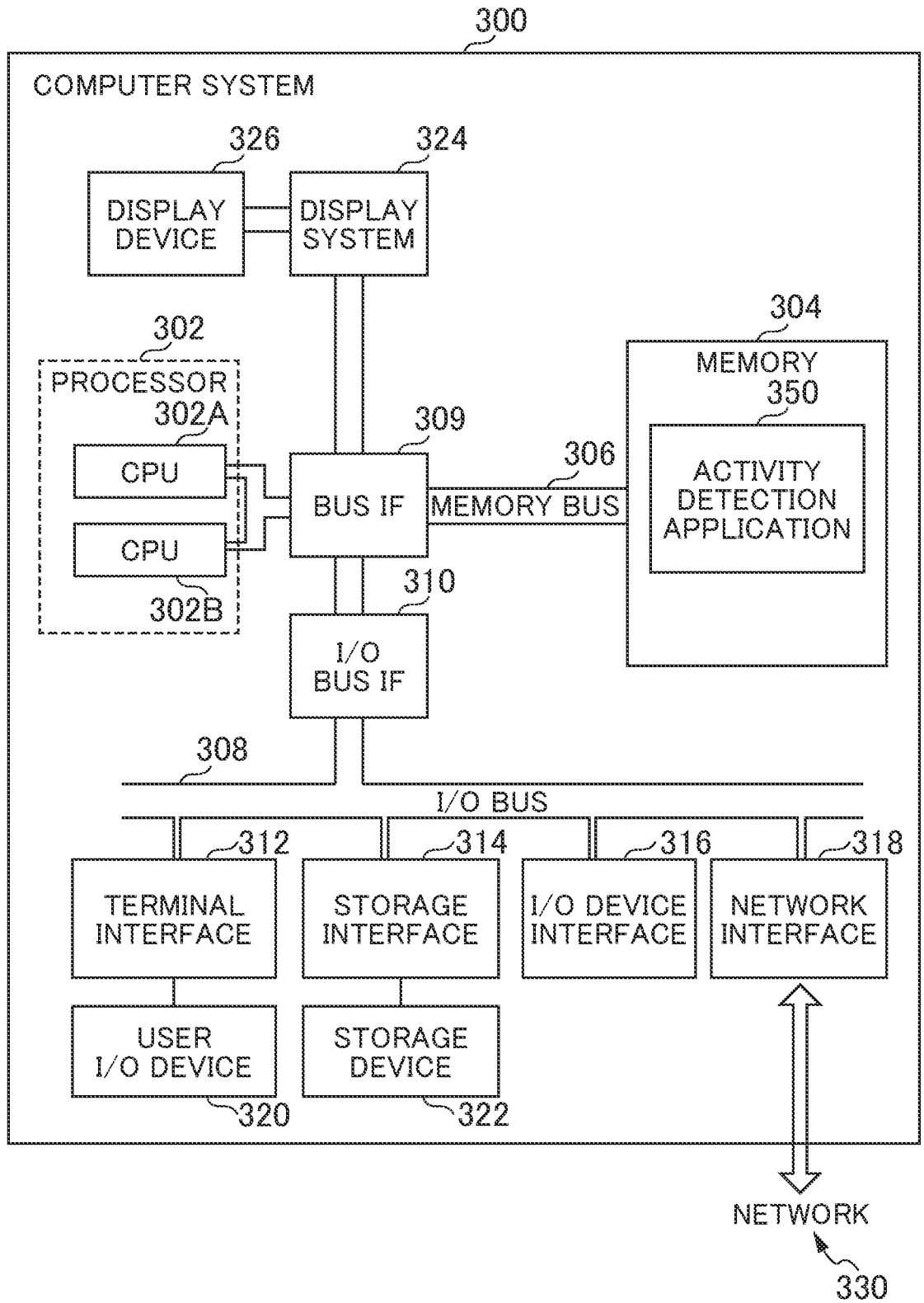
FIG. 1 is a diagram for showing a computer system for carrying out an embodiment of the disclosure.

Hereinafter, an embodiment of the disclosure will be described with reference to the drawings. Note that the disclosure is not limited by the embodiment. In addition, the same parts are followed by the same reference numerals in the drawings.

Outline of Embodiment

As described above, demand for technology that accurately identifies an activity related to a predetermined object, namely, "activity detection" has been increasing. In general, the activity detection includes spatially identifying an object related to a specific activity (so-called "object localization"), determining when the activity started and finished (so-called "activity recognition"), and discriminating the class of the activity (so-called "activity classification").

However, in order to train an end-to-end learnable activity detection system capable of performing the above-described activity detection with high accuracy, it is necessary to train each machine learning model such as an object detection model, an object tracking model, and an activity re-identification model that configure the activity detection system in an end-to-end manner, and a huge amount of learning data is necessary. Since it is difficult to obtain such a huge amount of learning data for each activity to be detected, it is difficult to construct and introduce a machine learning system for activity detection that can completely learn in an end-to-end manner.

In order to solve the above-described problem of the learning data, an already-trained machine learning model is used as each machine learning model such as an object detection model, an object tracking model, and an activity re-identification model that configure the activity detection system, and a pipeline for activity detection can be configured.

However, in the case of the pipeline for activity detection configured using such trained models, the following problems exist.

1) Since only the neural network for aggregating the output of each trained model and generating an activity detection result is trained by the backpropagation, each trained model is not trained together with the neural network, and the accuracy is not improved.

2) Since only the final activity detection result is output from the final layer of the pipeline, the halfway result of each trained model cannot be grasped, and the system becomes a black box.

3) Since a decision tree for defining conditional branches by manual operations of a user is necessary in order to handle a new object, much labor is required for the user, and the system cannot immediately handle the new object.

Accordingly, in the disclosure, characteristic information related to a target object is determined using an individually trainable component model. The component model herein may be at least one selected from, for example, an optical flow model, an object tracking model, an object identification model, a neural network feature model, an object attribute model, and an object skeleton model. The characteristic information of the object determined by the component model is aggregated to be expressed as, for example, an object state in a Markov model. Thereafter, an activity related to the object is detected based on the relationship and transition between the object states in the Markov model.

Since activity detection means according to the disclosure outputs not only the final activity detection result but also an explanation notification indicating a reason for supporting the result of the characteristic information generated by each component model, the user can individually evaluate the performance of each component model. If the performance of a specific component model is insufficient, only the component model can be retrained, and thus it is not necessary to retrain the entire system. In addition, since the determination is made based on the relationship and transition between the object states in the Markov model in the activity detection result according to the disclosure, it is not necessary to create a decision tree for defining conditional branches.

Accordingly, it is possible to provide more flexible and highly accurate activity detection means as compared to the past.

Next, a computer system 300 for carrying out the embodiment of the disclosure will be described with reference to FIG. 1. The various mechanisms and devices of the embodiment disclosed in the specification may be applied to arbitrary suitable computing systems. Main components of the computer system 300 include one or more processors 302, a memory 304, a terminal interface 312, a storage interface 314, an I/O (input/output) device interface 316, and a network interface 318. These components may be mutually connected via a memory bus 306, an I/O bus 308, a bus interface unit 309, and an I/O bus interface unit 310.

The computer system 300 may include one or more general-purpose programmable central processing units (CPUs) 302A and 302B collectively referred to as processors 302. In one embodiment, the computer system 300 may include plural processors, and in another embodiment, the computer system 300 may be a single CPU system. Each processor 302 executes commands stored in the memory 304, and may include an onboard cache.

In one embodiment, the memory 304 may include a random access semiconductor memory, a storage device, or a storage medium (either volatile or non-volatile) for storing data and programs. The memory 304 may store all or a part of programs, modules, and data structures that perform functions to be described in the specification. For example, the memory 304 may store an activity detection application 350. In one embodiment, the activity detection application 350 may include commands or descriptions that perform functions, to be described later, on the processor 302.

In one embodiment, the activity detection application 350 may be implemented by hardware via semiconductor devices, chips, logic gates, circuits, circuit cards, and/or other physical hardware devices instead of or in addition to a processor-based system. In one embodiment, the activity detection application 350 may include data other than commands or descriptions. In one embodiment, a camera, a sensor, or other data input devices (not shown in the drawing) may be provided so as to directly communicate with the bus interface unit 309, the processor 302, or other hardware of the computer system 300.

The computer system 300 may include a bus interface unit 309 that communicates among the processor 302, the memory 304, a display system 324, and the I/O bus interface unit 310. The I/O bus interface unit 310 may be coupled to the I/O bus 308 for transferring data to/from various I/O units. The I/O bus interface unit 310 may communicate with the plural I/O interface units 312, 314, 316, and 318 also known as I/O processors (IOPs) or I/O adapters (IOAs) via the I/O bus 308.

The display system 324 may include a display controller, a display memory, or both of them. The display controller can provide video data, audio data, or both data to a display device 326. In addition, the computer system 300 may include devices such as one or more sensors configured to collect data and provide the data to the processor 302.

For example, the computer system 300 may include a biometric sensor for collecting heart rate data, stress level data, and the like, an environmental sensor for collecting humidity data, temperature data, pressure data, and the like, and a motion sensor for collecting acceleration data, motion data, and the like. Other types of sensors can be used. The display system 324 may be connected to the display device 326 such as a single display screen, a television, a tablet, or a portable device.

The I/O interface unit has a function of communicating with various storages or I/O devices. For example, a user I/O device 320 such as a user output device such as a video display device or a speaker television, and a user input device such as a keyboard, a mouse, a keypad, a touchpad, a trackball, a button, a light pen, or other pointing devices can be attached to the terminal interface unit 312. A user may input data and instructions to the user I/O device 320 and the computer system 300 by operating the user input device using the user interface, and may receive output data from the computer system 300. The user interface may be displayed on a display device, reproduced by a speaker, or printed via a printer, for example, via the user I/O device 320.

One or more disk drives or a direct access storage device 322 (usually a magnetic disk drive storage device, but may be an array of disk drives or other storage devices configured to appear as a single disk drive) can be attached to the storage interface 314. In one embodiment, the storage device 322 may be mounted as an arbitrary secondary storage device. The contents of the memory 304 are stored in the storage device 322, and may be read from the storage device 322 as needed. The I/O device interface 316 may provide interfaces to other I/O devices such as printers and fax machines. The network interface 318 may provide a communication path so that the computer system 300 and other devices can mutually communicate with each other. The communication path may be, for example, a network 330.

In one embodiment, the computer system 300 may be a device that receives requests from a multi-user mainframe computer system, a single-user system, or other computer systems (client), such as a server computer, having no direct user interface. In another embodiment, the computer system 300 may be a desktop computer, a portable computer, a notebook computer, a tablet computer, a pocket computer, a telephone, a smartphone, or other arbitrary suitable electronic devices.

Next, a configuration of an activity detection system according to the embodiment of the disclosure will be described with reference to FIG. 2.

Figure 2:
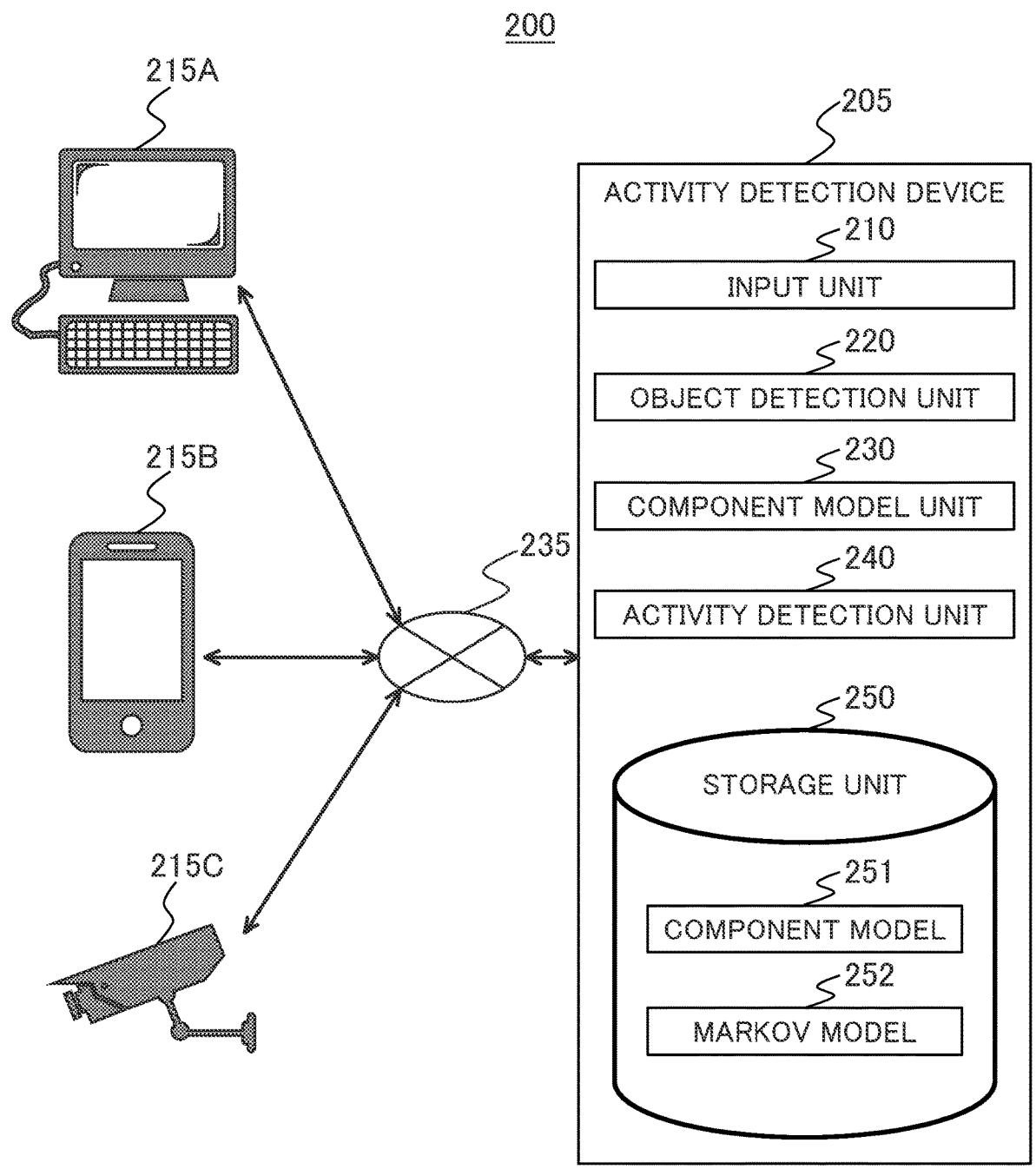
FIG. 2 is a diagram for showing an example of a configuration of an activity detection system according to the embodiment of the disclosure.

FIG. 2 is a diagram for showing an example of a configuration of an activity detection system 200 according to the embodiment of the disclosure. As shown in FIG. 2, the activity detection system 200 mainly includes client terminals 215A, 215B, and 215C, a network 235, and an activity detection device 205. The activity detection device 205 is connected to the client terminals 215A, 215B, and 215C via the network 235.

The client terminals 215A, 215B, and 215C (hereinafter, collectively referred to as a "client terminal 215") are terminals for requesting the activity detection device 205 for an image sequence to be analyzed in an activity detection process. The client terminal 215 may transmit a condition telegram designating a condition such as an activity or an object to be detected to the activity detection device 205, or may receive an activity detection result indicating the result of the activity detection from the activity detection device 205.

The client terminal may be a terminal used by an individual or a terminal in an organization such as a police station or a private company. In addition, the client terminal 215 may be, for example, an arbitrary device such as a desktop personal computer, a notebook personal computer, a tablet, or a smartphone.

In addition, the client terminal 215 may be a sensor, a camera, or the like. For example, the client terminal 215 according to the embodiment of the disclosure may be a monitoring camera for recording and acquiring an image sequence to be analyzed.

Note that although FIG. 2 shows a configuration including three client terminals as an example, the disclosure is not limited thereto, and the number and types of client terminals 215 of the activity detection system 200 may be appropriately selected according to the purpose of use of the activity detection system 200. In addition, the client terminals 215 may be terminals of the same client or different clients.

The activity detection device 205 is a device that performs the activity detection process on a predetermined target image sequence, and temporally and spatially identifies and classifies an activity related to an object in the target image sequence. As will be described later, the activity detection device 205 may output an activity detection result indicating information such as the spatial-temporal coordinates and category of the detected activity to the above-described client terminal 215.

As shown in FIG. 2, the activity detection device 205 includes an input unit 210, an object detection unit 220, a component model unit 230, an activity detection unit 240, and a storage unit 250.

The input unit 210 is a function unit for acquiring an image sequence to be analyzed from the client terminal 215. For example, the input unit 210 may acquire a video recorded by the client terminal 215 such as a monitoring camera installed on a platform of a station or the like as a sequence of target images. For example, the target image sequence to be acquired may be configured using plural images (at least a first image and a second image). In addition, the input unit 210 may acquire a condition telegram designating a condition such as an activity or an object to be detected, together with the target image sequence, from the client terminal 215.

The object detection unit 220 is a function unit for detecting an object (for example, a first object, a second object, or the like) in the target image sequence. For example, the object detection unit 220 may detect an object using an arbitrary method such as machine learning techniques of Viola-Jones Object Detection, Scale-invariant feature transform, and Histogram of oriented gradients, and deep learning techniques of Region Proposals, Single Shot Multibox Detector, You Only Look Once, Single-shot Refinement Neural Network for Object Detection, Retina-Net, Deformable convolutional Networks.

The object detection unit 220 may detect from the target image sequence an object designated by the condition telegram acquired from, for example, the client terminal 215A or the like, or may detect all objects in the target image sequence.

The component model unit 230 is a function unit that includes at least one component model for determining characteristic information related to an object used in the activity detection process. The component models herein are individually trainable machine learning and deep learning models. Here, the "individually trainable" means that the model can be trained by training data irrelevant to a target activity detection task. Accordingly, each component model is trained by data that matches the task of the component model and is easier to obtain, and thus it is not necessary to obtain an enormous amount of training data suitable for the target activity detection task.

Note that although the component model unit 230 may include at least one component model, it is desirable to include plural component models in order to extract characteristic information that more highly characterizes the object detected from the image sequence. In addition, the number and types of component models included in the component model unit may be appropriately selected according to the purpose of use of the activity detection system 200.

The activity detection unit 240 is a function unit for determining, based on the characteristic information of the object determined by the component model unit 230, an activity related to the object and outputting the activity detection result. More specifically, the activity detection unit 240 may generate, based on the characteristic information of the object determined by the component model unit 230, an object state corresponding to the object for each image (frame) in which the object detected in the target image sequence appears, and may detect the activity based on the transition of these object states in the Markov model.

Note that the "activity related to the object" herein may be an action (throwing a ball, and the like) performed by the object, an action (being bitten by a dog, and the like) performed on the object, or an arbitrary event occurring in the same spatial-temporal region as the object.

The storage unit 250 is a storage unit for storing various types of data used by the above-described function units. As shown in, for example, FIG. 2, the storage unit 250 may store a component model 251 used for the component model unit 230 and a Markov model 252 used for the activity detection unit 240. The storage unit 250 herein may be an arbitrary storage medium such as a flash memory or a hard disk drive.

The component model 251 is an individually trainable component model used by the component model unit 230. As an example, the component models according to the embodiment of the disclosure may include an optical flow model, an object tracking model, an object re-identification model, a neural network feature model, an object attribute model, an object skeleton model, and the like, but other component models may be used. Note that a configuration in which the storage unit 250 stores one component model 251 is shown in FIG. 2 as an example, but in practice, a configuration including plural component models 251 is also possible as described above.

The Markov model 252 is a Markov model used in the activity detection process by the activity detection unit 240. The Markov model 252 is a probability model for modeling a system that irregularly changes. The details of the Markov model 252 will be described later.

With the configuration described above, the activity detection system 200 according to the embodiment of the disclosure can provide more flexible and highly accurate activity detection means by determining the characteristic information related to a target object using the individually trainable component model and generating an activity detection result based on the object state generated from the characteristic information.

Next, the activity detection process according to the embodiment of the disclosure will be described with reference to FIG. 3.

Figure 3:
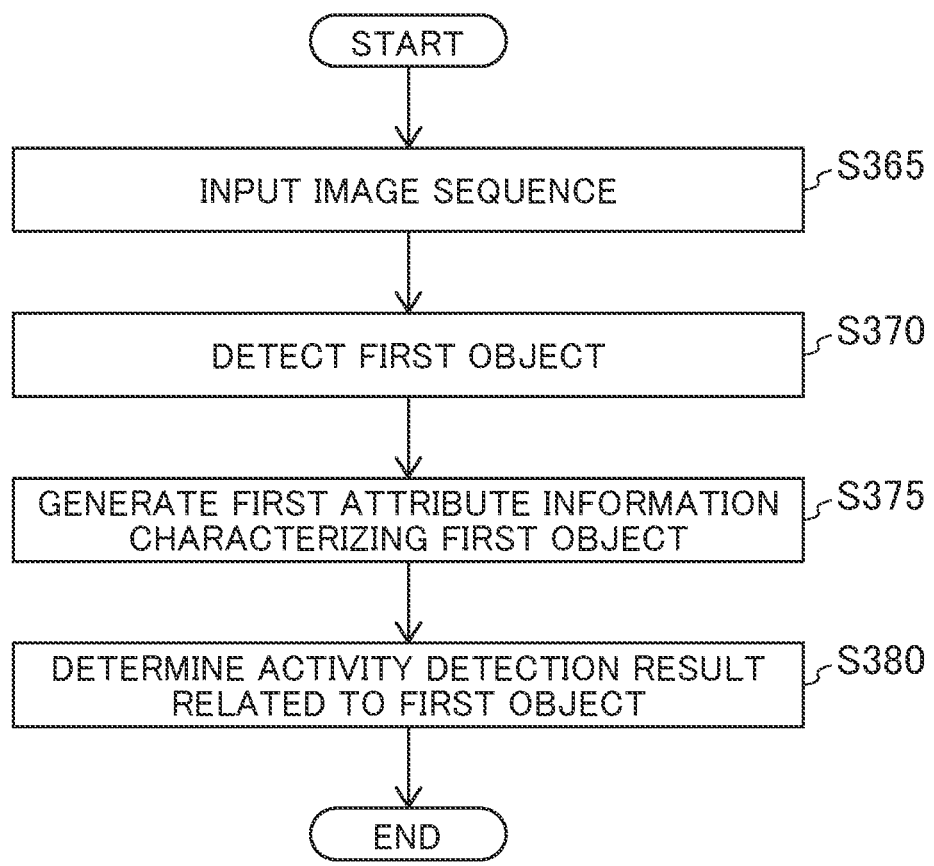
FIG. 3 is a diagram for showing an example of a flow of an activity detection process according to the embodiment of the disclosure.

FIG. 3 is a diagram for showing an example of a flow of an activity detection process 360 according to the embodiment of the disclosure. The activity detection process 360 shown in FIG. 3 is executed by the trained activity detection device, and is a process for determining an activity related to an object appearing in the target image sequence and outputting an activity detection result indicating the activity.

First, in Step S365, the input unit (for example, the input unit 210 of the activity detection device 205 shown in FIG. 2) of the activity detection device inputs an image sequence configured using plural images. The image sequence herein may be, for example, an image sequence (video of a monitoring camera, or the like) that is transmitted from the client terminal to the activity detection device and is to be analyzed in the activity detection process. In addition, the input unit of the activity detection device herein may receive a condition telegram designating a condition such as an activity or an object to be detected together with the image sequence. As an example, the condition telegram may designate "a person who leaves a store without paying for merchandise of the shop" or "identify the behavior of a man who is wearing a red hat".

Next, in Step S370, the object detection unit (for example, the object detection unit 220 of the activity detection device 205 shown in FIG. 2) of the activity detection device detects a first object from the image sequence input in Step S365. The first object herein may be, for example, the object (for example, "a man who is wearing a red hat") designated by the condition telegram received in Step S365 or an arbitrary object in the target image sequence. Here, in order to detect the first object, the object detection unit may use an arbitrary method such as R-CNN (Region-based Convolutional Neural Network), Faster RCNN (Faster Region-based Convolutional Neural Network), SPP-NET (Spatial Pyramid Pooling Network), YOLO (You Only Look Once), SSD (Single Shot Detection), R-FCN (Region-based Fully Convolutional Networks), Mask-RCNN (Mask Region-based Convolutional Neural Network), Cascade R-CNN (Cascade Region-based Convolutional Neural Network), or the like.

Next, in Step S375, the component model unit (for example, the component model unit 230 of the activity detection device 205 shown in FIG. 2) of the activity detection device generates first characteristic information characterizing the first object detected in Step S370 for each image configuring the image sequence. As described above, the component model unit herein may include the optical flow model, the object tracking model, the object re-identification model, the neural network feature model, the object attribute model, the object skeleton model, and the like.

In addition, the characteristic information herein is information indicating characteristics of the first object such as spatial coordinates, temporal coordinates, a moving path, a feature quantity, a size, a color, a class (a human, a dog, a car, or the like), and skeleton information. The characteristic information generated in Step S375 differs depending on the number, types, and functions of component models. For example, if the component model unit includes a convolutional neural network and a skeleton detection model such as Openpose, the characteristic information generated in Step S375 includes the feature quantity of the first object generated by the convolutional neural network and the skeleton information of the first object generated by Openpose.

In Step S380, the activity detection unit of the activity detection device determines an activity related to the first object based on the characteristic information generated in Step S375, and outputs the activity detection result indicating the activity. More specifically, the activity detection unit 240 expresses the characteristic information of the object generated by the component model unit 230 as the object state in the Markov model for each image configuring the image sequence, and determines the activity of the first object based on the relationship and transition between the object states.

As an example, a case in which the image sequence includes a first image and a second image will be considered. First, as described above, the image sequence is input to the input unit, and then processed by each component model included in the component model unit to generate the characteristic information characterizing the first object. Thereafter, the activity detection unit may generate a first object state corresponding to the first object in the first image and a second object state corresponding to the first object in the second image in the Markov model based on the characteristic information generated by the component model, determine the activity related to the first object based on the first object state and the second object state, and output the activity detection result indicating the activity. The activity detection result may be a notification indicating information such as the category (what happened), temporal coordinates (when it happened), spatial coordinates (where it happened), and an involved object (what object was involved) of the detected activity. In addition, for example, the activity detection result generated herein may be returned to the client terminal requesting the activity detection.

Next, a training stage of the activity detection device according to the embodiment of the disclosure will be described with reference to FIG. 4.

Figure 4:
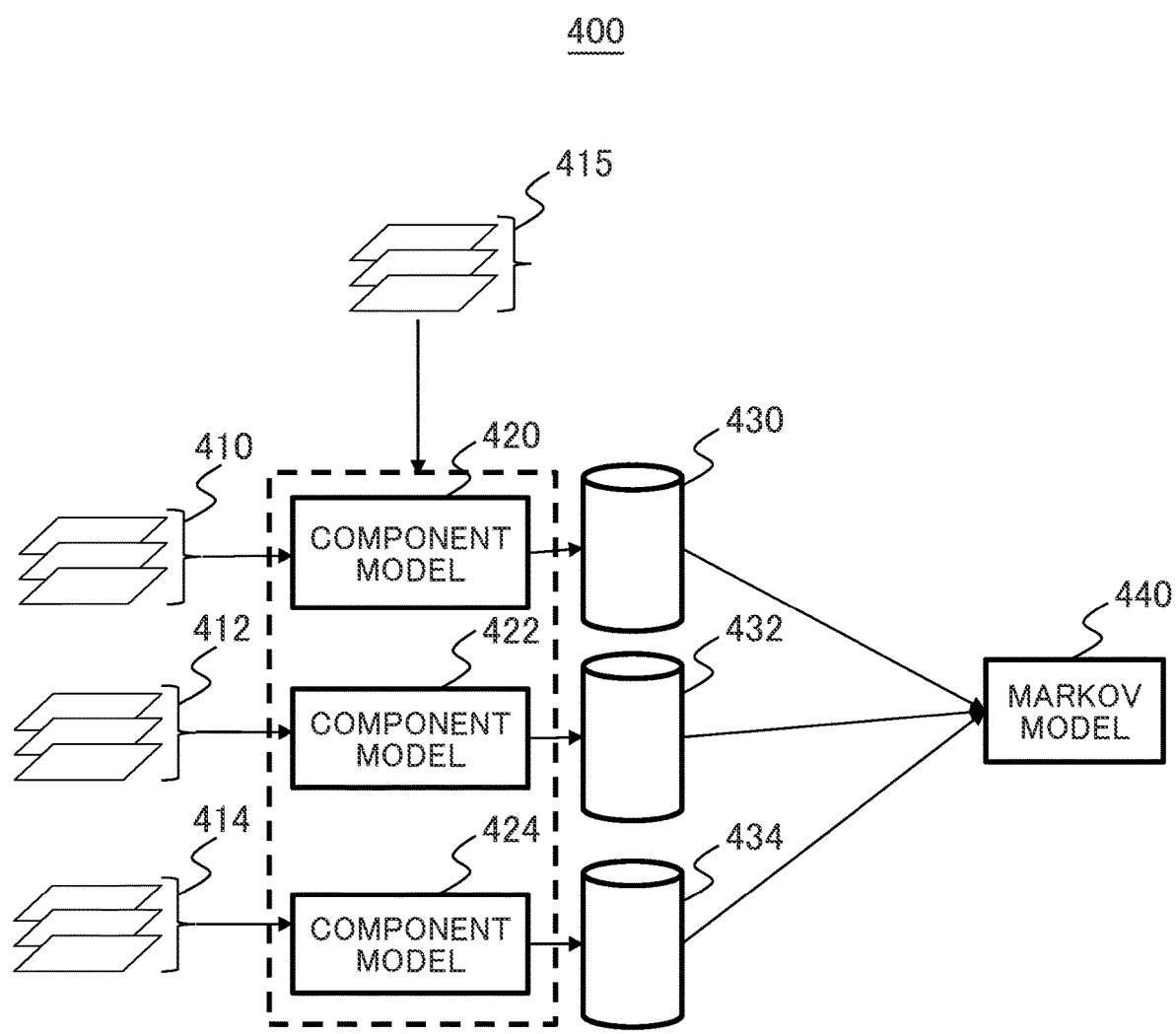
FIG. 4 is a diagram for showing an example of a training stage of an activity detection device according to the embodiment of the disclosure.

FIG. 4 is a diagram for showing an example of a training stage of an activity detection device 400 according to the embodiment of the disclosure. As described above, the activity detection means according to the embodiment of the disclosure uses the Markov model trained by outputs of plural individually trainable component models to detect an activity.

As described above, the component model herein may be selected from, for example, the optical flow model, the object tracking model, the object re-identification model, the neural network feature model, the object attribute model, and the object skeleton model.

As shown in FIG. 4, the activity detection device 400 mainly includes component models 420, 422, and 424 and a Markov model 440. Note that the component models 420, 422, and 424 shown in FIG. 4 substantially correspond to the component model 251 shown in FIG. 2, and the Markov model 440 substantially corresponds to the Markov model 252 shown in FIG. 2, respectively.

The initial training of each of the component models 420, 422, and 424 is individually performed by training data 410, 412, and 414. Each of the training data 410, 412, and 414 herein need not be training data for activity detection, but may be data selected based on the type and function of the component model. For example, if the component model 420 is an object tracking model for tracking an object in a video, the training data 410 may be training data for tracking an object. In addition, each of the training data 410, 412, and 414 may be data corresponding to different domains, or data related to each other.

As described above, the initial training of each of the component models 420, 422, and 424 is individually performed using training data of different domains, so that the training data can be easily obtained, and more advanced analysis accuracy can be achieved as compared to a case in which these component models are collectively trained using the same data for activity detection. Note that although a configuration in which the initial training of each of the component models 420, 422, and 424 is performed based on different training data has been described above as an example, the disclosure is not limited thereto, and it is obvious that the initial training of each of the component models 420, 422, and 424 may be performed based on the training data for activity detection.

After the above-described training for each domain is completed, training data 415 for activity detection is input to each of the component models 420, 422, and 424. The training data 415 for activity detection may be, for example, an image sequence configured using plural images.

Each of the component models 420, 422, and 424 analyzes the training data 415 for activity detection to generate, for each image configuring the training data 415 for activity detection, characteristic information 371, 372, and 373 characterizing objects in the image. Note that the process of generating the characteristic information may be performed for each object in the image. In addition, the contents of the characteristic information 430, 432, and 434 herein differ depending on the type of component model. For example, when the component model 422 is an object attribute unit, the characteristic information 432 generated by the component model 422 may generate information indicating attributes such as the size, shape, and color of the object as the characteristic information.

The Markov model 440 is trained by the characteristic information 430, 432, and 434 generated by the component models 420, 422, and 424, respectively. More specifically, the Markov model 440 may generate, for each image configuring the image sequence, an object state corresponding to each object based on the characteristic information 430, 432, and 434 generated for each object. Accordingly, each object in each image configuring the image sequence of the training data 415 for activity detection corresponds to a different object state in the Markov model 440.

The object state herein is a data structure indicating the characteristics of an object in a one-dimensional semantic binary format. As an example, if a target object is a human, the object state generated for the object may indicate various characteristics in a binary format, such as whether the object is running, having baggage, and riding a bicycle.

As described above, the Markov model 440 generates, for each image configuring the training data 415 for activity detection, the object state based on the characteristic information generated by each of the component models 420, 422, and 424, and is trained by these object states. In addition, as will be described later, an object related to a target object can be accurately detected by using the trained Markov model 440.

Next, an inference stage of the activity detection device according to the embodiment of the disclosure will be described with reference to FIG. 5.

Figure 5:
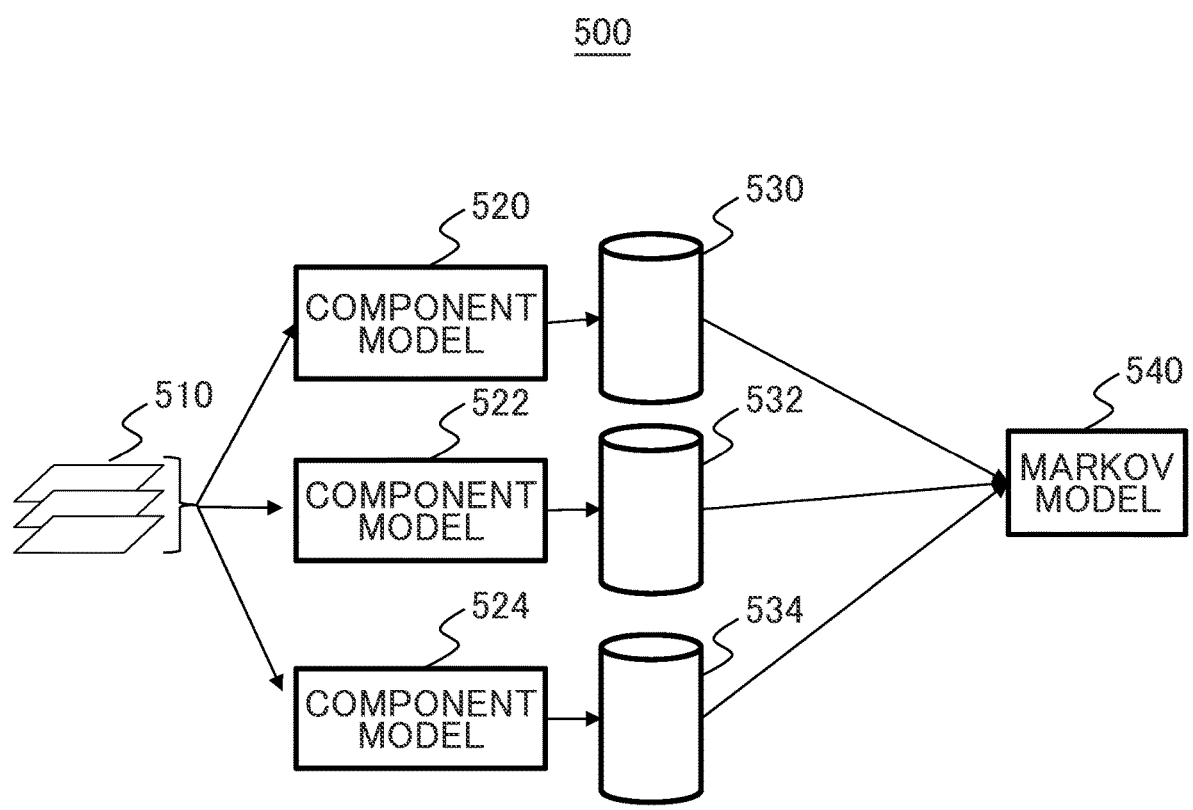
FIG. 5 is a diagram for showing an example of an inference stage of an activity detection device according to the embodiment of the disclosure.

FIG. 5 is a diagram for showing an example of an inference stage of an activity detection device 500 according to the embodiment of the disclosure. In the inference stage, the component models and the Markov model trained in the training stage described with reference to FIG. 4 perform a process of activity detection for the target image sequence.

As shown in FIG. 5, the activity detection device 500 mainly includes component models 520, 522, and 524 and a Markov model 540. Note that the component models 520, 522, and 524 and the Markov model 540 shown in FIG. 5 substantially correspond to the component models 420, 422, and 424 and the Markov model 440 shown in FIG. 4, respectively, except that they have already been trained, and thus the description thereof is herein omitted.

First, each of the component models 520, 522, and 524 inputs an image sequence 510 as a target of activity detection, and processes the same according to the type and function of the component, so that characteristic information 530, 532, and 534 related to objects appearing in the image sequence 510 are generated for each image configuring the image sequence 510. For example, when the component model 520 is an object attribute unit, the component model 520 may generate information indicating attributes such as the size, shape, and color of the object as the characteristic information 530.

Figure 6:
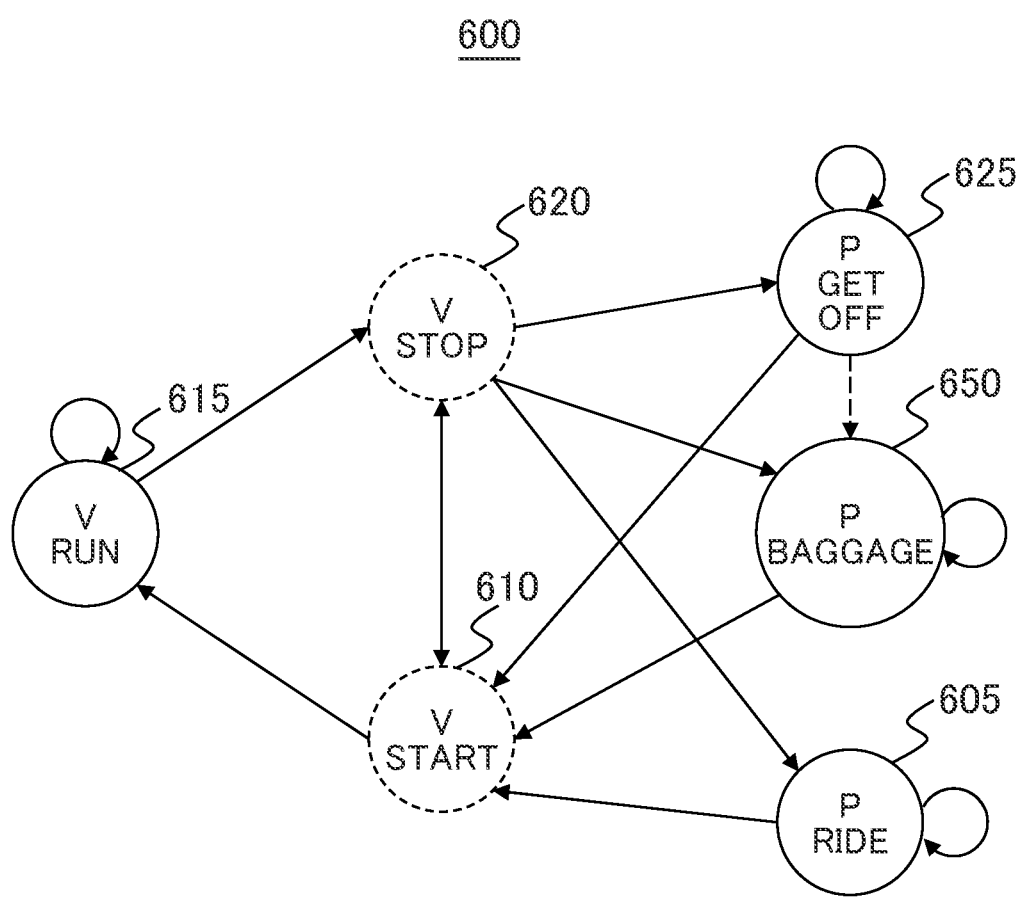
FIG. 6 is a diagram for showing an example of a Markov model according to the embodiment of the disclosure.

Thereafter, the Markov model 540 expresses the characteristic information 530, 532, and 534 generated by the respective component models 520, 522, and 524 as object states in the Markov model 540, and determines an activity related to the object appearing in the image sequence 510 based on these object states as shown in FIG. 6 to be described later.

Next, a Markov model according to the embodiment of the disclosure will be described with reference to FIG. 6.

FIG. 6 is a diagram for showing an example of a Markov model 600 according to the embodiment of the disclosure. The Markov model 600 shown in FIG. 6 substantially corresponds to, for example, the Markov model 252 shown in FIG. 2. The Markov model 600 is a probability model for modeling a system that irregularly changes. In the Markov model 600, it is assumed that a state in the future depends only on the present state and is not affected by events that happened in the past.

In the disclosure, by expressing the characteristic information generated by the above-described component models as the object states in the Markov model, object states in the future can be predicted and object states not appearing in the target image sequence can be derived based on the relationship and transition between the object states, and the activity of the object can be accordingly determined.

Figure 7:
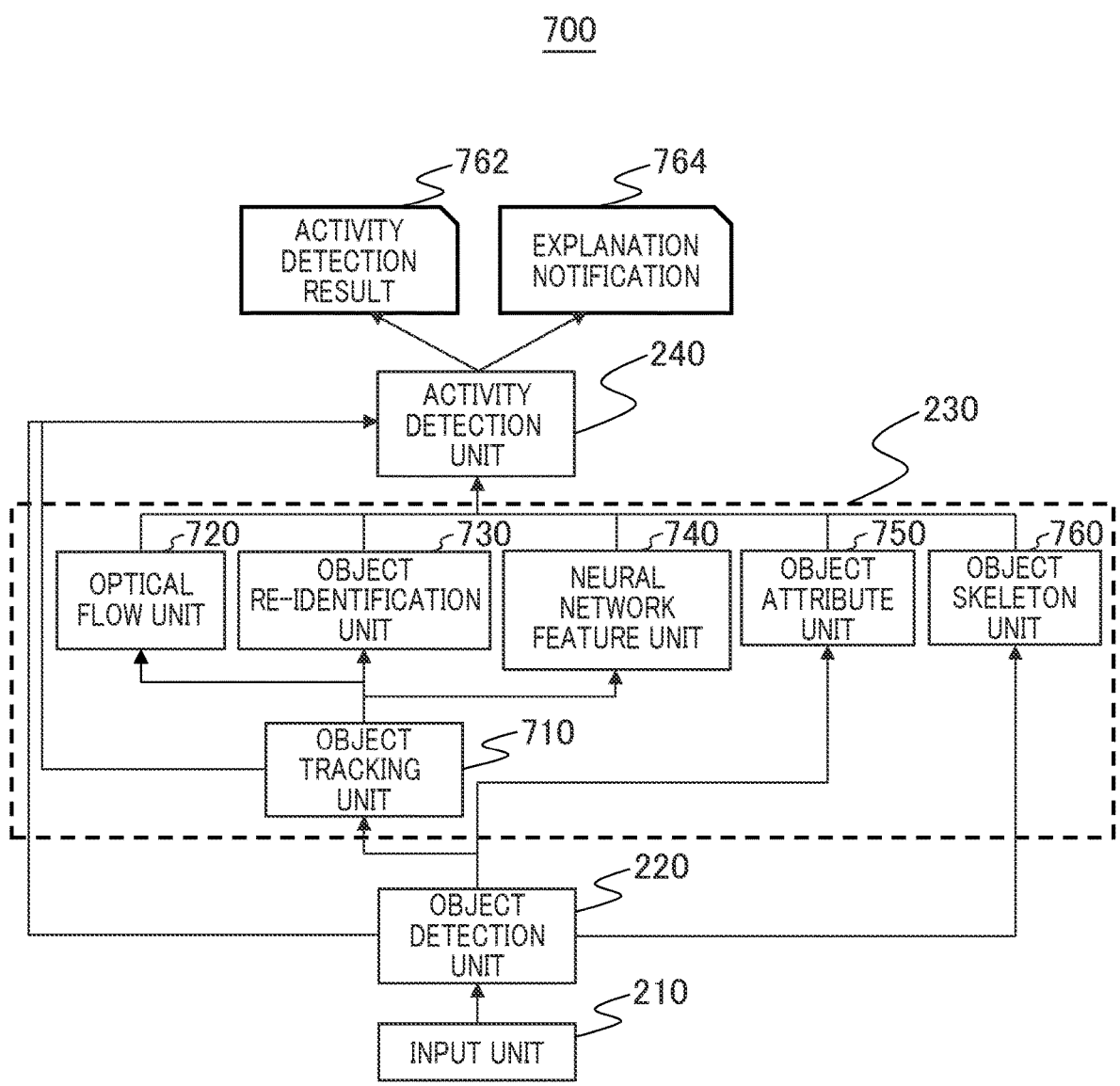
FIG. 7 is a diagram for showing a concrete example of the activity detection device according to the embodiment of the disclosure.

Note that although a case in which the characteristic information generated by the above-described component models is expressed as the object states in the Markov model and the activity detection is performed based on these object states will be hereinafter described as an example, the present invention is not limited thereto, and it is conceivable to, for example, set a so-called knowledge graph as a new layer between the component models and the Markov model. However, the knowledge graph cannot express a change with the passage of time, and thus a configuration as shown in, for example, FIG. 7 is desirable from the viewpoint of expressing a change with the passage of time to enhance the accuracy of the activity detection. In addition, a graph convolution or a probabilistic graphical model can be also used as an activity detection method.

Hereinafter, as an example of the Markov model according to the embodiment of the disclosure, a case in which an image sequence showing a situation where a human ("P" shown in FIG. 6) as the first object starts a vehicle ("V" shown in FIG. 6) as the second object, runs, and stops is to be analyzed will be described.

First, as described above, when each image configuring the target image sequence is analyzed by the above-described component model, the characteristic information related to each object is generated for each image, and the object state for each object is generated for each image in the Markov model based on the characteristic information. For example, as shown in FIG. 6, an object state 605 in which the human rides in the vehicle, an object state 615 in which the vehicle runs, an object state 625 in which the human gets off, and an object state 650 in which the human gets baggage out of the vehicle are generated based on the target image sequence. Accordingly, each object state corresponds to a specific object appearing in a specific image in the image sequence.

In addition, the Markov model 600 can derive an object state corresponding to an event that does not explicitly appear in the target image sequence based on the causal relationship between the generated object states. For example, the Markov model 600 may derive an object state 610 in which the vehicle is started based on the object state 605 in which the human rides in the vehicle and the object state 615 in which the vehicle runs, and may add the same to the model. In addition, as another example, the Markov model may derive an object state 620 in which the vehicle stops based on the object state 615 in which the vehicle runs and the object state 625 in which the human gets off, and may add the same to the model.

After the object state for each object is generated for each image in the Markov model 600, the activity of the target object may be determined. More specifically, the activity of the first object may be detected based on the first object state corresponding to the first object in the first image and the second object state corresponding to the first object in the second image. For example, an activity of "the human moved by the vehicle" may be determined based on the object state 605 (first object state) in which the human rides in the vehicle and the object state 625 (second object state) in which the human gets off.

Note that although a case in which the determination of the activity is performed based on the two object states corresponding to the same object has been described above as an example, the Markov model 600 according to the embodiment of the disclosure is not limited thereto, and the determination of the activity may be performed based on three or more object states corresponding to the same object or object states corresponding to plural different objects.

For example, in one embodiment, the determination of the activity of the first object state may be performed based on the object states corresponding to the second object in the same image sequence. More specifically, the activity of the first object may be determined based on the object state corresponding to the first object and the object state corresponding to the second object. For example, an activity of "the human drives the vehicle" may be determined based on the object state 605 in which the human (first object) rides in the vehicle and the object state 615 in which the vehicle (second object) runs. In principle, in order to more accurately detect an activity in detail, it is desirable to perform the activity detection based on as many object states as possible.

As described above, by expressing the characteristic information generated by the component models as the object states in the Markov model, object states in the future can be predicted and object states not appearing in the target image sequence can be derived based on the relationship between the object states, and the activity of the object can be accordingly determined.

Note that although a case in which the determination of the activity is performed based on at least one object state has been described above as an example, the present invention is not limited thereto, and the determination of the activity may be performed based on the transition of the object states. The transition of the object states herein means a transition (namely, a change or shift of the object state) from one object state to another object state. In addition, the transition of the object states may be also expressed as new object states in the Markov model. The activity detection with higher accuracy can be performed by determining the activity based on the transition of the object states.

Next, a concrete example of the activity detection device according to the embodiment of the disclosure will be described with reference to FIG. 7.

FIG. 7 is a diagram for showing a concrete example of the activity detection device 205 according to the embodiment of the disclosure. As shown in FIG. 7, the activity detection device 205 mainly includes the input unit 210, the object detection unit 220, the component model unit 230, and the activity detection unit 240.

Note that since these function units substantially correspond to the function units of the activity detection device 205 described with reference to FIG. 2, the description thereof is herein omitted.

As described above, the component model unit 230 according to the embodiment of the disclosure may include at least one of an arbitrary machine learning model, deep learning model, probability model, and software module as a component model according to the purpose of use of the activity detection. For example, the component model unit 230 shown in FIG. 7 may include an object tracking unit 710, an optical flow unit 720, an object re-identification unit 730, a neural network feature unit 740, an object attribute unit 750, an object skeleton unit 760 as component models.

The object tracking unit 710 is a component model for tracking the detected first object in each image configuring the image sequence, and may use techniques such as SORT (Simple Online and Realtime Tracking), DeepSORT, and Discriminative Correlation Filter.

The optical flow unit 720 is a component model for representing the motion of the first object in the image sequence by a vector or the like, and may use, for example, techniques such as Phase Correlation, Block-based Methods, Differential Method, and Discrete Optimization Method.

The object re-identification unit 730 is a component model for determining whether or not the object appearing in each image configuring the image sequence is the first object, and may use, for example, techniques such as Edge Pattern, HOG (Histogram of oriented gradients) Features, SIFT (Scale Invariant Feature Transform) Features, and CNN Features.

The neural network feature unit 740 is a component model for extracting the feature quantity of the first object, and may use, for example, techniques such as GoLeNet, ResNet, ResNext, DenseNet, and CNN.

The object attribute unit 750 is a component model for determining the attributes (size, gender, color, class, and the like) of the first object, and may use, for example, techniques such as HOG, SIFT, CNN, GoLeNet, ResNet, ResNext, and DenseNet.

The object skeleton unit 760 is a component model for estimating the skeleton of the first object, and may use, for example, techniques such as Pictorial Structures Framework, Deformable Part Models, OpenPose, PifPaf, PoseFlow, Convolutional Pose Machines, DeepCut, Stacked Hour-Glass Network, and HRNet. As shown in FIG. 7, for example, when the object detected by the object detection unit 220 is a human, the object skeleton unit 760 may directly input the output of the object detection unit 220.

First, as described above, after the input unit 210 acquires the image sequence to be analyzed from the client terminal (for example, the client terminal 215A, 215B, 215C, or the like shown in FIG. 2), the object detection unit 220 detects, from the image sequence, the first object designated by the condition telegram received from the client terminal together with, for example, the image sequence to be analyzed.

Then, each component model of the component model unit 230 generates the characteristic information characterizing the first object for each image configuring the image sequence. For example, when the component model unit 230 is configured as shown in FIG. 7, each of the object tracking unit 710, the optical flow unit 720, the object re-identification unit 730, the neural network feature unit 740, the object attribute unit 750, and the object skeleton unit 760 processes the image sequence to generate the characteristic information characterizing the first object.

In addition, each component model may generate information related to the generation process of the characteristic information together with the characteristic information as an explanation notification. The explanation notification may be information indicating a reason for supporting the result of the characteristic information. For example, when it is determined that the first object is a "woman" as one of the attributes of the first object as a result of processing the image sequence, the object attribute unit 750 may generate "the object was determined as a woman because of the long hair and wearing a dress" as an explanation notification indicating a reason for supporting this result. The explanation notification of each component model generated herein is transferred to the activity detection unit 240 together with the characteristic information.

Thereafter, as described above, the activity detection unit 240 aggregates the characteristic information generated by each component model, and generates, for each image configuring the image sequence, the object state based on the characteristic of the first object in the image. Next, as described above, the activity detection unit 240 determines the activity of the first object based on the relationship and transition between the object states in the Markov model. Then, the activity detection unit 240 may output an explanation notification 764 generated by each component model together with an activity detection result 762 indicating the determined activity of the first object. Further, an image or text of a graph showing the relationship between states in the Markov model and the result of the transition performed in the process within the activity detection unit 240 may be output as the explanation notification 764. In this case, for example, a reason for supporting the determination of "the vehicle stops and detection of the human is started from the location of the vehicle" is output, as the explanation notification 764, with respect to the activity detection result 762 of "the human gets out of the vehicle".

Accordingly, the user who confirms the output of the activity detection unit 240 can confirm the activity detection result 762 together with the explanation notification 764 indicating the reason for supporting the characteristic information on which the activity detection result is based. Therefore, for example, when the activity detection result by the activity detection unit 240 is wrong, it is possible to more easily grasp which component model caused the wrong activity detection among the component models by confirming the explanation notification from each component model. In addition, in order to improve the activity detection accuracy of the activity detection device by correcting the wrong activity detection result, only the component model causing the wrong activity detection result can be retrained instead of all the component models, and thus the training of the activity detection device can be more efficiently performed as compared to the past.

In addition, in one embodiment, the above-described component models (for example, the optical flow unit 720, the object re-identification unit 730, the neural network feature unit 740, the object attribute unit 750, and the object skeleton unit 760) may be retrained based on the activity detection result of the Markov model (not illustrated in FIG. 7). For example, if the component model is a neural network, the component model may be retrained by the backpropagation based on the activity detection result of the Markov model.

As an example, although a specific activity is detected in the activity detection result by the Markov model, when the characteristic information generated by a certain component model includes a wrong characteristic or the like not corresponding to the activity, the accuracy of the component model can be improved by retraining the component model using the activity detection result by the Markov model.

Although the embodiment of the disclosure has been described above, the disclosure is not limited to the above-described embodiment, and can be variously changed without departing from the gist of the disclosure.

What is claimed is:

1. An activity detection device comprising:
a processor; and
a memory coupled to the processor, the memory storing instructions that when executed by the processor configures the processor to:
store a plurality of individually trainable component models which are machine learning models including at least a convolutional neural network model and an object skeleton model,
input an image sequence including at least a first image and a second image,
detect a first object in the image sequence,
generate first characteristic information characterizing the first object, which includes a first feature quantity of the first object generated by the convolutional neural network and first skeleton information of the first object generated by the object skeleton model,
generate a first object state corresponding to the first object in the first image and a second object state corresponding to the first object in the second image based on the first feature quantity of the first object and the first skeleton information of the first object as the first characteristic information,
determine an activity related to the first object based on the first object state and the second object state, and
output a first activity detection result indicating the determined activity, and
wherein the processor is further configured to:
detect a second object in the image sequence,
determine second characteristic information characterizing the second object which includes a second feature quantity of the second object generated by the convolutional neural network and second skeleton information of the second object generated by the object skeleton model, and
generate a third object state corresponding to the second object in the first image based on the second characteristic information,
determine an activity related to the first object based on the first object state, the second object state, and the third object state, and
output a second activity detection result indicating the determined activity.

2. The activity detection device according to claim 1, wherein the plurality of component models includes at least one of an optical flow model, an object tracking model, an object re-identification model, and an object attribute model.

3. The activity detection device according to claim 1, wherein each component model generates information related to a generation process of the first characteristic information as an explanation notification, and
wherein the processor is configured to output the explanation notification together with the first activity detection result.

4. The activity detection device according to claim 3, wherein the first object state and the second object state indicate a characteristic characterizing the first object in a semantic binary format.

5. The activity detection device according to claim 4, wherein the processor is configured to generate the first object state and the second object state in a Markov model, and determine the activity related to the first object based on a relationship between the first object state and the second object state in the Markov model.

6. The activity detection device according to claim 5, wherein the processor is configured to determine the activity related to the first object based on a transition from the first object state to the second object state in the Markov model.

7. The activity detection device according to claim 6, wherein the processor is configured to derive an object state corresponding to an event not shown in the image sequence based on a causal relationship between the first object state and the second object state in the Markov model.

8. The activity detection device according to claim 7, wherein the processor is configured to output the relationship between the first object state and the second object state used in the determination of the activity related to the first object as the explanation notification.

9. The activity detection system according to claim 1, wherein the first characteristic information is information indicating characteristics of the first object including at least one of spatial coordinates, temporal coordinates, a moving path, a size, or a color.

10. An activity detection system in which a client terminal and an activity detection device are connected to each other via a communication network,
wherein the activity detection device comprises:
a processor; and
a memory coupled to the processor, the memory storing instructions that when executed by the processor configures the processor to:
store a plurality of individually trainable component models which are machine learning models including at least a convolutional neural network model and an object skeleton model,
input an image sequence including at least a first image and a second image from the client terminal,
detect a first object in the image sequence,
generate first characteristic information characterizing the first object which includes a first feature quantity of the first object generated by the convolutional neural network and first skeleton information of the first object generated by the object skeleton model,
generate a first object state corresponding to the first object in the first image and a second object state corresponding to the first object in the second image based on the first feature quantity of the first object and the first skeleton information of the first object as the first characteristic information,
determine an activity related to the first object based on the first object state and the second object state, and
output an activity detection result indicating the determined activity to the client terminal, and
wherein the processor is further configured to:
detect a second object in the image sequence,
determine second characteristic information characterizing the second object which includes a second feature quantity of the second object generated by the convolutional neural network and second skeleton information of the second object generated by the object skeleton model, generate a third object state corresponding to the second object in the first image based on the second characteristic information, determine an activity detection result related to the first object based on the first object state, the second object state, and the third object state, and output a second activity detection result indicating the determined activity.

11. The activity detection system according to claim 10, wherein the first characteristic information is information indicating characteristics of the first object including at least one of spatial coordinates, temporal coordinates, a moving path, a size, or a color.

12. An activity detection method comprising:
a step of storing a plurality of individually trainable component models which are machine learning models including at least a convolutional neural network model and an object skeleton model;
a step of inputting an image sequence including at least a first image and a second image;
a step of detecting a first object in the image sequence;
a step of generating first characteristic information characterizing the first object which includes a first feature quantity of the first object generated by the convolutional neural network and first skeleton information of the first object generated by the object skeleton model; and
a step of generating a first object state corresponding to the first object in the first image and a second object state corresponding to the first object in the second image based on the first feature quantity of the first object and the first skeleton information of the first object as the first characteristic information;
determining an activity related to the first object based on the first object state and the second object state;
outputting an activity detection result indicating the determined activity,
a step of detecting a second object in the image sequence;
a step of generating second characteristic information characterizing the second object which includes a second feature quantity of the second object generated by the convolutional neural network and second skeleton information of the second object generated by the object skeleton model; and
a step of generating a third object state corresponding to the second object in the first image based on the second characteristic information;
a step of determining an activity related to the first object based on the first object state, the second object state, and the third object state; and
a step of outputting a second activity detection result indicating the determined activity.

13. The activity detection method according to claim 12, wherein the step of generating first characteristic information characterizing the first object by using at least one individually trainable component model further comprises a step of generating information related to a generation process of the first characteristic information as an explanation notification.

14. The activity detection method according to claim 12, wherein the first characteristic information is information indicating characteristics of the first object including at least one of spatial coordinates, temporal coordinates, a moving path, a size, or a color.

* * * * *